United States Patent
Yu et al.

(10) Patent No.: US 11,108,756 B2
(45) Date of Patent: *Aug. 31, 2021

(54) IDENTITY DATA BASED ON AGGREGATING INPUT DATA

(71) Applicant: PayPal, Inc., San Jose, CA (US)

(72) Inventors: Carmen S. Yu, Fremont, CA (US); Nicole Padellan Kim, San Jose, CA (US); David Edward Eramian, Mountain View, CA (US); Christina Marie Vallery, Austin, TX (US); Miguel Angel Escobedo, Austin, TX (US); Joao Paulo Malhinha, San Jose, CA (US); Michael S. Hwang, San Francisco, CA (US); Michael Voege, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 15/694,661

(22) Filed: Sep. 1, 2017

(65) Prior Publication Data
US 2018/0103024 A1    Apr. 12, 2018

Related U.S. Application Data

(63) Continuation of application No. 14/695,977, filed on Apr. 24, 2015, now Pat. No. 9,756,032.

(51) Int. Cl.
*H04L 29/06* (2006.01)
*G06F 1/16* (2006.01)

(52) U.S. Cl.
CPC .............. *H04L 63/08* (2013.01); *G06F 1/163* (2013.01); *H04L 63/0861* (2013.01)

(58) Field of Classification Search
CPC .................................. G06F 21/32; H04L 63/08
See application file for complete search history.

(56) References Cited

U.S. PATENT DOCUMENTS

| | | |
|---|---|---|
| 2008/0133403 A1 | 6/2008 | Hamzeh |
| 2010/0033303 A1* | 2/2010 | Dugan ..................... A63F 13/71 340/5.82 |
| 2012/0278139 A1 | 11/2012 | Mercuri et al. |
| 2013/0332353 A1 | 12/2013 | Aidasani et al. |
| 2014/0085050 A1 | 3/2014 | Luna |
| 2014/0279528 A1 | 9/2014 | Slaby et al. |
| 2014/0337634 A1 | 11/2014 | Starner et al. |
| 2015/0046711 A1 | 2/2015 | Slaby et al. |

(Continued)

FOREIGN PATENT DOCUMENTS

EP           3286680         2/2018

*Primary Examiner* — Dao Q Ho
(74) *Attorney, Agent, or Firm* — Haynes and Boone, LLP

(57) ABSTRACT

A computing device, a system, and a method are provided to receive a number of inputs associated with one or more sensors of the computing device. One or more processors are configured to determine input data based on the number of inputs and authenticate a user account based on the input data. A communication interface is enabled to communicate with one or more devices based on the authentication. Further, the system may aggregate the input data based on the number of inputs. The system may determine identity data of the user account based on the aggregation. The system may transmit an indication of the identity data to the computing device.

20 Claims, 8 Drawing Sheets

(56) References Cited

U.S. PATENT DOCUMENTS

| | | |
|---|---|---|
| 2015/0089635 A1 | 3/2015 | Alpert et al. |
| 2016/0182496 A1* | 6/2016 | Weast ................. H04L 63/0853 726/3 |
| 2016/0191511 A1 | 6/2016 | Tijerina et al. |
| 2018/0103024 A1 | 4/2018 | Yu et al. |

* cited by examiner

600 →

602 — Aggregating, by one or more processing components of a server device, input data associated with a number of inputs received by a computing device 604 — Determining, by the one or more processing components of the server device, identity data of a user account based on at least the aggregation of the input data, where the identity data indicates one or more activities of the user account 606 — Transmitting, by a communication interface of the server device, an indication of the identity data to a computing device configured to access the user account

FIG. 6

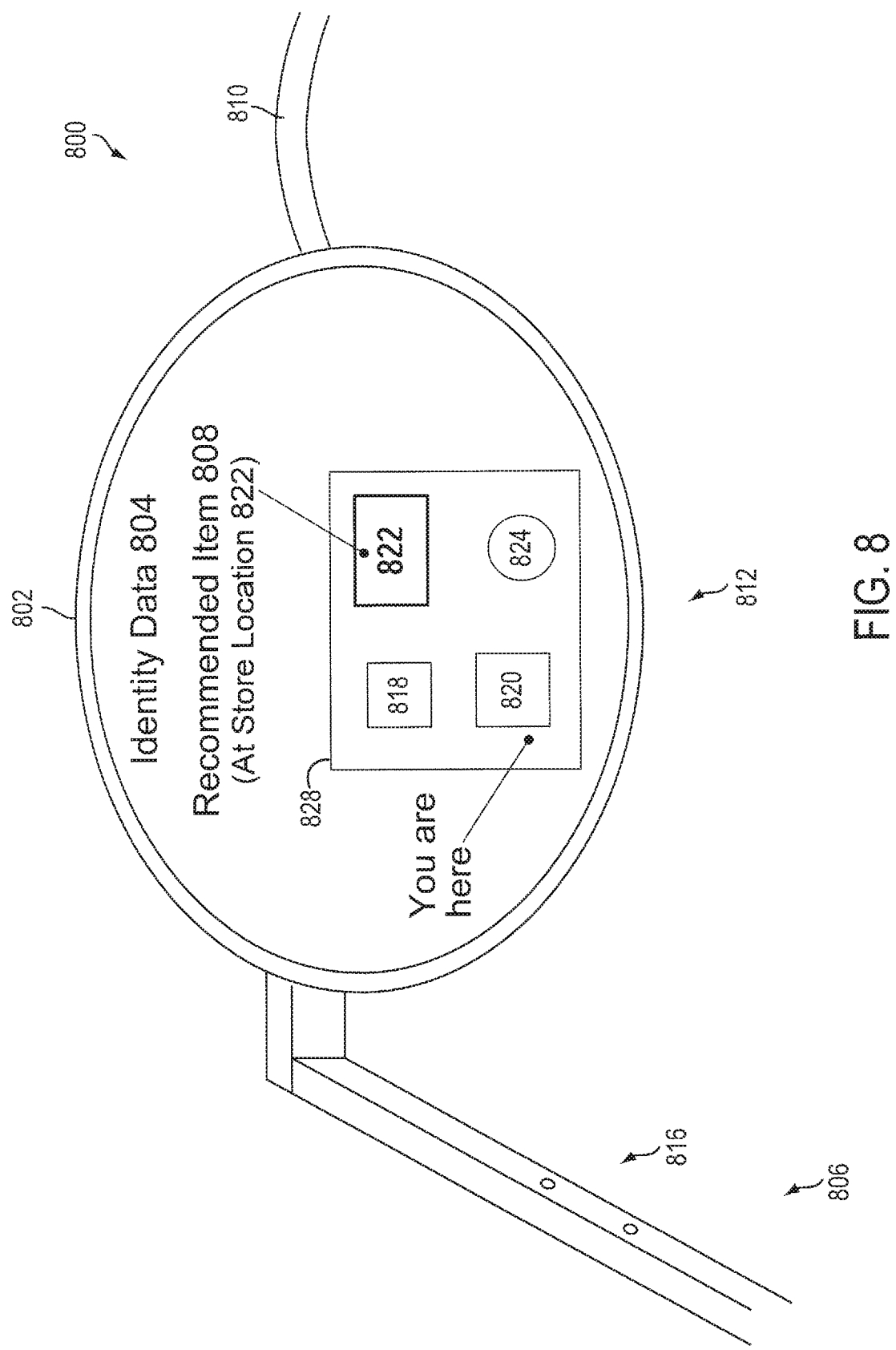

IDENTITY DATA BASED ON AGGREGATING INPUT DATA

TECHNICAL FIELD

This disclosure generally relates to computing devices, and more particularly, determining identity data based on an aggregation of input data from the computing devices and the user.

BACKGROUND

Various computing devices such as personal computers, laptop computers, tablet computers, smart phones, and numerous other devices are increasingly more prevalent in the technological landscape. With the advent of these devices conforming to numerous aspects of modern lifestyles, the manner in which these devices provide data is becoming more intelligent, efficient, and intuitive. As such, various trends towards miniaturization of biometric sensors, computing hardware, peripherals, processors, among other forms of technologies, have helped pave the way for technology referred to mobile computing devices and wearable computing devices.

Many computing devices are designed to be carried or worn from one locale to another with minimal effort. Yet, such designs have opened up a myriad of possible issues. For example, the effortless transferability of such devices has created numerous opportunities for theft and taking these devices away from their rightful owners. As a result, fraudulent activities through such computing devices are also becoming more prevalent as unauthorized users perform actions using these devices without rightful consent.

Even further, various forms of security technologies have been proven ineffective. For example, biometric security measures generally require some active step taken by the owner, such as pressing a finger on a fingerprint sensor for locking or unlocking the device. Yet, such measures have inconsistencies and varying levels of success because providing fingerprint data simply to operate the device may be inconvenient and inefficient as well. Further, these biometric data itself is also susceptible to theft such that these security measures may be wholly circumvented by interceptors who may copy and use the biometric data to gain unauthorized accesses.

Thus, there is much need for improvement in security technology related to computing devices.

BRIEF DESCRIPTION OF THE DRAWINGS

FIG. 6 is a flowchart of an exemplary method, according to an embodiment;

FIG. 8 illustrates an exemplary wearable computing device, according to an embodiment.

Figure 1A:
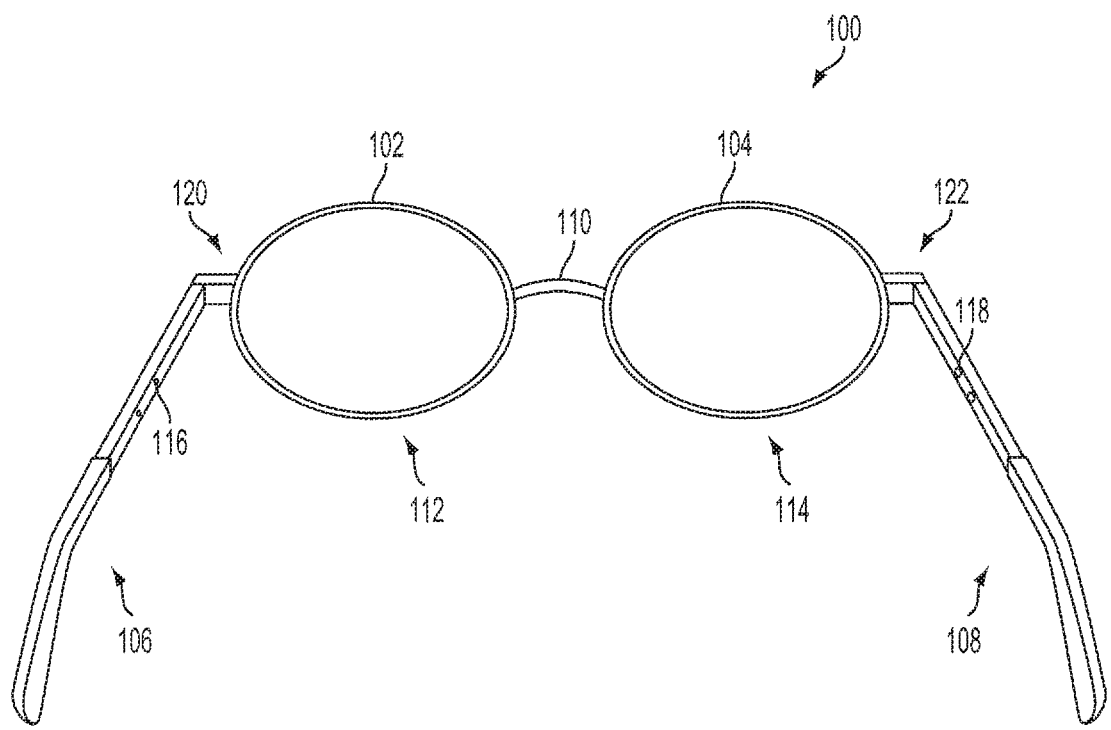
FIGS. 1A and 1B illustrate an exemplary computing device, according to an embodiment.

Embodiments of the present disclosure and their advantages may be understood by referring to the detailed description that follows. It should be appreciated that like reference numerals are used to identify elements illustrated in one or more of the figures, where the figures illustrate various examples for purposes of examples and explanation related to the embodiments of the present disclosure and not for purposes of limitation.

DETAILED DESCRIPTION

A computing device may include one or more sensors configured to interface with humans and receive numerous inputs accordingly. One type of input such as, for example, a drop of sweat or saliva may be used to identify a particular user. Further, in addition to active inputs such as fingerprint inputs and voice command inputs, passive inputs may also be received such as movement inputs based on the way a particular user moves, talks, eats, walks, gestures via hands or fingers, and/or changes direction, among other natural movements that may be used to recognize the user. By identifying various forms of data based on a number of such inputs, the computing device may authenticate the user's account, enabling the device to authorize activities under the account.

Even further, by tracking inputs as the user goes about the day, the authentication of the account may be continuously verified. For example, a second attachable computing device may be clipped on to the user's clothing or otherwise carried by the user to receive a second set of inputs, possibly to confirm the passive inputs received by the computing device described above so as to continually verify the authentication of the user account. Based on this continual verification, the computing device may be enabled to securely communicate with other devices (e.g., merchant devices) and applications (e.g., online shopping websites). For instance, the computing device may communicate without having to transfer any authentication data to the other devices and/or applications so as to indicate the user account is authenticated. Thus, the user may be able to seamlessly authorize activities with merchant devices and applications without swiping credit cards, showing identification, logging in to applications, and/or taking other conventional steps to show the user account is properly authenticated.

Moreover, by accessing the several inputs in the manner above, various portions of the input data may be aggregated from the computing device and/or the attachable computing device. In the aggregation process, a system may compile such portions to determine an identity of the user account and provide recommendations to the user. For example, the system may determine various identities of a user account (e.g., the user shopping at a mall location) and thereby recommend items based on shopping patterns at the mall location, possibly identified from the input data such as movement data indicating the way the user stops at given stores to look at particular items. In practice, the system may, for example, determine an identity or activity of the user shopping for pants and trying on different pairs of pants based on movement data of the user. Thus, the system may recommend pants offered at specific stores in the mall location, possibly based on one or more sizes of the user determined from the input data and/or historical user data based on prior shopping experiences.

Figure 1B:
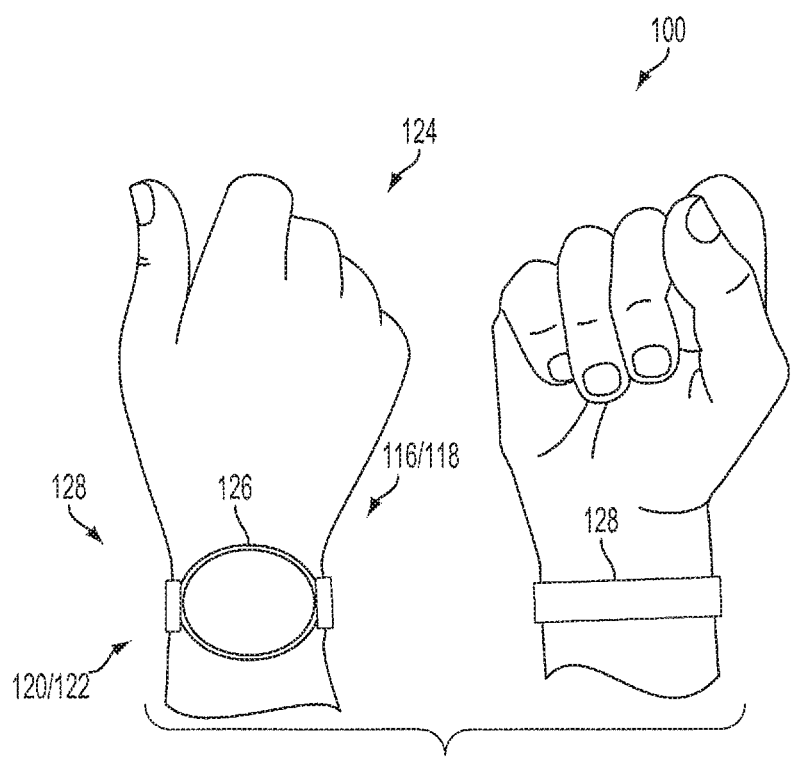

FIGS. 1A and 1B provide an exemplary a computing device 100, according to an embodiment. The computing device 100 may take the form of a smartphone. Further, as shown, the computing device 100 may take the form of a wearable computing device. The computing device 100 may include a head-mountable display and an arm or wrist-mountable display. As shown in FIG. 1A, the computing device 100 may be wearable as a head-mountable device (HMD). The computing device 100 may include lenses 102 and 104. The computing device 100 may also include a side component 106, a side component 108, and a middle component 110. For example, the computing device 100 may be mountable on a user's head such that the side component 106 rests on one ear of the user and the side component 108 rests on the other ear of the user. Further, the middle component 110 may rest on the nose of the user. In some instances, the lenses 102 and 104 may be positioned in front of the user's eyes. Further, the lenses 102 and 104 may include displays 112 and 114, respectively. In some instances, the displays 112 and 114 may be transparent, partially see-through, and/or configured to provide an augmented reality. Further, the displays 112 and/or 114 may display data and receive proximity inputs (e.g., capacitive sensing inputs) such that the user can manipulate graphics provided by the displays 112 and/or 114. The lenses 102 and/or 104 may also include scanners such as laser scanners configured to scan the eyes of the user to retrieve biometric data from the user's eyes, retinas, and/or irises, possibly for authenticating the user's account.

As shown in FIG. 1B, the computing device 100 may also take the form of an arm/wrist-mountable device or a smart watch. Yet, the computing device 100 may take the form of a bracelet, an anklet, and/or a necklace, among other forms of jewelry. As shown, the band 128 may be adjustable to fit on an arm and/or wrist 124 of a user. As shown, the case 126 may be positioned on the top of the wrist 124 to operate as the face of a wrist watch. The band 128 may be configured to detect one or more patterns of pulses from the wrist 124 of the user, possibly for authenticating the user's account.

The computing device 100 may include one or more sensors 116 and/or 118 configured to receive a number of inputs associated with the user. The one or more sensors 116 and/or 118 may include accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to receive inputs from human matter. For example, based on the way the computing device 100 is worn as a head-mountable device or an arm/wrist-mountable device, the sensors 116 and/or 118 may be configured to receive inputs directly and/or indirectly from skin, sweat, saliva, blood, nails, and/or hair, among other inputs related to the user.

Further, the computing device 100 may include one or more processing components 120 configured to determine input data based on the number of inputs. For example, input data may include Deoxyribonucleic acid (DNA) data, salivary data, sweat data, pulse data, hair data, nail data, blood data, and/or a combination of such data, among other forms of data related to the user.

Yet further, the one or more processor components 120 may authenticate a user account based on the input data. The one or more processor components 120 may utilize built-in logic to compare various forms of the determined input data with data associated with the user account. For example, the DNA data from the input data may be compared with DNA associated with the user account. The one or more processor components 120 may determine a match or a partial match to authorize a user to operate the computing device 100. Thus, the one or more processor components 120 may authenticate the user account based on such matches determined.

In addition, the computing device 100 may include a communication interface 122 that may be enabled to communicate with one or more other devices based on the authentication of the user account. For example, the communication interface 122 may be disabled unless and/or until the one or more processors 120 authenticates the user account. Thus, the communication interface 122 may be disabled such that it cannot communicate with any other devices and/or applications, thereby securing data within the computing device 100. Yet, based on the authentication of the user account, the communication interface 122 may be enabled to communicate with the other devices and/or applications to authorize activities of the user account. For example, based on the communication with the other devices, the communication interface may access second input data based on a second plurality of inputs associated with the user.

The one or more sensors 116 and/or 118 may be further configured to determine whether the computing device 100 is separated from the user, such as the arm or wrist 124. For example, the one or more sensors 116 and/or 118 may include a capacitance sensor that measures the capacitance and changes in the capacitance based on the computing device 100 being separated from the user. Another example may involve a pulse sensor periodically measuring the pulse of the wrist 100. The one or more processing components 120 may be further configured to modify the authentication of the user account based on the determination of the separation and/or the measurements of the pulse. For instance, a thief may snatch the computing device 100 off of the wrist 124 of the rightful owner, where the one or more sensors 116 and/or 118 may detect the device is separated from the owner. Furthermore, the one or more sensors 116 and/or 118 may no longer detect the user's pulse patterns, possibly unique to the user. Thus, the one or more processing components 120 may disable or withdraw the authentication, possibly powering down the computing device 100 and/or disabling the communication interface 122, as described above.

The one or more processors components 120 may be further configured to determine passive input data from the input data and verify the authentication of the user account based on the passive input data. For example, the one or more processor components 120 may determine various forms of movement data associated with the user account to continually verify the authentication. In some instances, when the computing device 100 is worn on the user's wrist 124, the processor components 120 may determine movement data indicating how the computing device 100 moves with the wrist 124 as the user naturally walks. The movement data may indicate certain patterns based on the user's strides to verify the authentication of the user account. Further, when the computing device 100 is worn on the user's head, the one or more processor components 120 may determine movement data indicating how the computing device 100 moves on the user's head as the user eats breakfast and/or talks during breakfast to verify the authentication of the account.

In some instances, the passive input data may include movement data and/or size data associated with the user. Further, the one or more processing components 120 may be configured to verify the authentication of the user account based on the movement data, the size data, and/or a combination of such data. In one example, the one or more processing components 120 may determine a combination of the movement data and size data based on the computing device 100 being worn on the user's wrist 124 during one or more steady states, where the size data may be based on the circumference of the user's wrist 124 measurable by the band 128 of computing device 100. Based on the combination of the movement data and size data matching those associated with the user account, the authentication of the user account may be verified.

Figure 2:
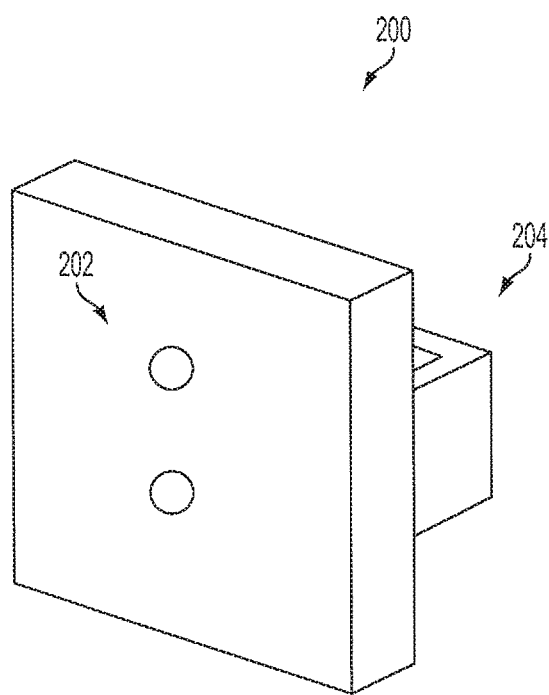
FIG. 2 illustrates an exemplary computing device, according to an embodiment.

In some instances, the one or more other devices may include an computing device 200 configured to receive a second number of inputs associated with the user via the one or more sensors 202. FIG. 2 provides an exemplary a computing device 200, according to an embodiment. The computing device 200 may take the form of a smartphone. Further, as shown, the computing device 200 may take the form of an attachable computing device. The one or more sensors 202 may, for example, take the form of the one or more sensors 116 and/or 118 of the computing device 100. The communication interface 122 of the computing device 100 may be configured to access the second number of inputs received by the attachable computing device 200. Further, the one or more processing components 120 of the computing device 100 may be further configured to determine second input data based on at least the second plurality of inputs. As such, the one or more processing components 120 may verify the authentication of the user account based on at least the second input data. Further, the computing device 100 may utilize the second input data to verify (e.g., check the accuracy or precision) of the input data from the one or more sensors 116 and/or 118, possibly in the presence of noise and/or other interferences. Yet further, the computing device 100 may utilize the second input data when the one or more sensors 116 and/or 118 are not receiving input data, possibly due to damage and/or a slight or temporary separation of the computing device 100 from the user.

As shown, the computing device 200 may clip on to the computing device 100 using a clip 204. Further, the computing device 200 may clip on a tie, a belt buckle, and/or other piece of clothing, among other materials to be located proximate to the computing device 100. Yet further, the computing device 200 may take the form of a piece of jewelry such as an earring, a ring, a bracelet, and/or a watch that may make contact with the user's skin to receive biometric data. In some instances, the communication interface 122 of the computing device 100 may connect or link with the attachable computing device 200, possibly through a short-range wireless communication protocol such as BLUETOOTH or BLE (BLUETOOTH LOW ENERGY). Based on the connection and/or link, the computing device 100 may indicate or trigger various identities such as a shopping identity such that the computing device 100 may communicate with merchant devices and/or applications to authorize one or more activities under the user account.

The one or more processing components 120 may be further configured to determine identity data of the user account based on an aggregation of the first input data from the computing device 100 and second input data from the attachable computing device 200. For example, various portions of the input data described above may be aggregated to determine the identity data. As such, the identity data may indicate one or more activities of the user account, such as shopping for a gift or clothing, shopping for groceries, running an errand, using an automated teller machine (ATM), bargain hunting, and/or eating/drinking food/beverages, among other activities of the user account. Further, the communication interface 124 may be configured to communicate with a merchant device of the one or more other devices based on the identity data. In some instances, the communication interface 122 may be configured to access one or more applications and secure the identity data and the first and second input data from the one or more applications such that the one or more applications are unable to access the identity data and the input data.

In some embodiments, a user account, possibly also referred to as an account, may be a compilation of data associated with a user and/or the user's interests. As such, some examples may include accounts to an international digital wallet, possibly based on an e-commerce business, such as PAYPAL®, of San Francisco, Calif., USA and/or accounts to an online service for tickets to events, such as STUBHUB®, of San Francisco, Calif., USA. Further, some examples of accounts may include e-mail accounts, social networking accounts, financial accounts, e-commerce accounts, smartphone accounts, wearable computing device accounts, and/or accounts with service providers, among other possibilities. For example, an account for a particular user may include data related to the user, data related to the user's interest, and/or data representing the user. In some embodiments, a user may have a single account to an international digital wallet representing the user for multiple other accounts described above such as a social networking account, an e-mail account, and/or a financial account, as well as websites, applications, and/or other services. For example, a user could opt to use their digital wallet account as a multi-purpose account. For example, the user may use the digital wallet account to search for available items at store locations.

The user account may be displayed on a computing device, such as those described above in relation to FIGS. 1A and 1B. As such, the user account may be displayed on a smartphone, a laptop computer, and/or a tablet computer, among other devices that may be used to access the account. The user may operate the computing device and their account may be managed on the computing device. For example, the computing device may be used to receive account data, send search requests, and/or store data associated with the account such that details regarding the account may be viewed on the computing device. Further, login information may be provided to authenticate the account and payment information may be provided to secure and/or purchase items under the account.

In some embodiments, a user account may indicate or recommend various items that the user may be interested in. For example, the user account may identify or recommend types of clothing or brands, categories of food or beverages, and/or genres of movies or films, among other items that the user may be interested in. Further, the user account may identify or recommend sporting teams, music groups, and/or comedians that the user may be interested in. For example, the computing devices described above may gather data regarding the user and compile the data to the user's account. In particular, the computing device may track previous purchases at given store locations and update the user account accordingly, possibly to predict or recommend future purchases, incentives, or items that the user may be interested in. Further, the computing device may track user's preferences of available items at the given store locations and update the user account accordingly with possible recommended items. As such, the computing device may provide such recommendations when the user is proximate to the store locations.

In some embodiments, an account may be created by one or more users. Further, the account may be created by services, applications, and/or other websites, among other possibilities. As such, various users may have access to a particular account. For example, the user may be a corporation with access to a corporate account, possibly for its employees, staff, worker personnel, and/or contractors, among other individuals. Yet further, a user may be a computing device, a computing system, a robotic system, and/or another form of technology capable of sending and receiving data corresponding to the account. A user may provide a login, a password, a code, authentication data, biometric data, and/or other types of data to access the account.

Figure 3:
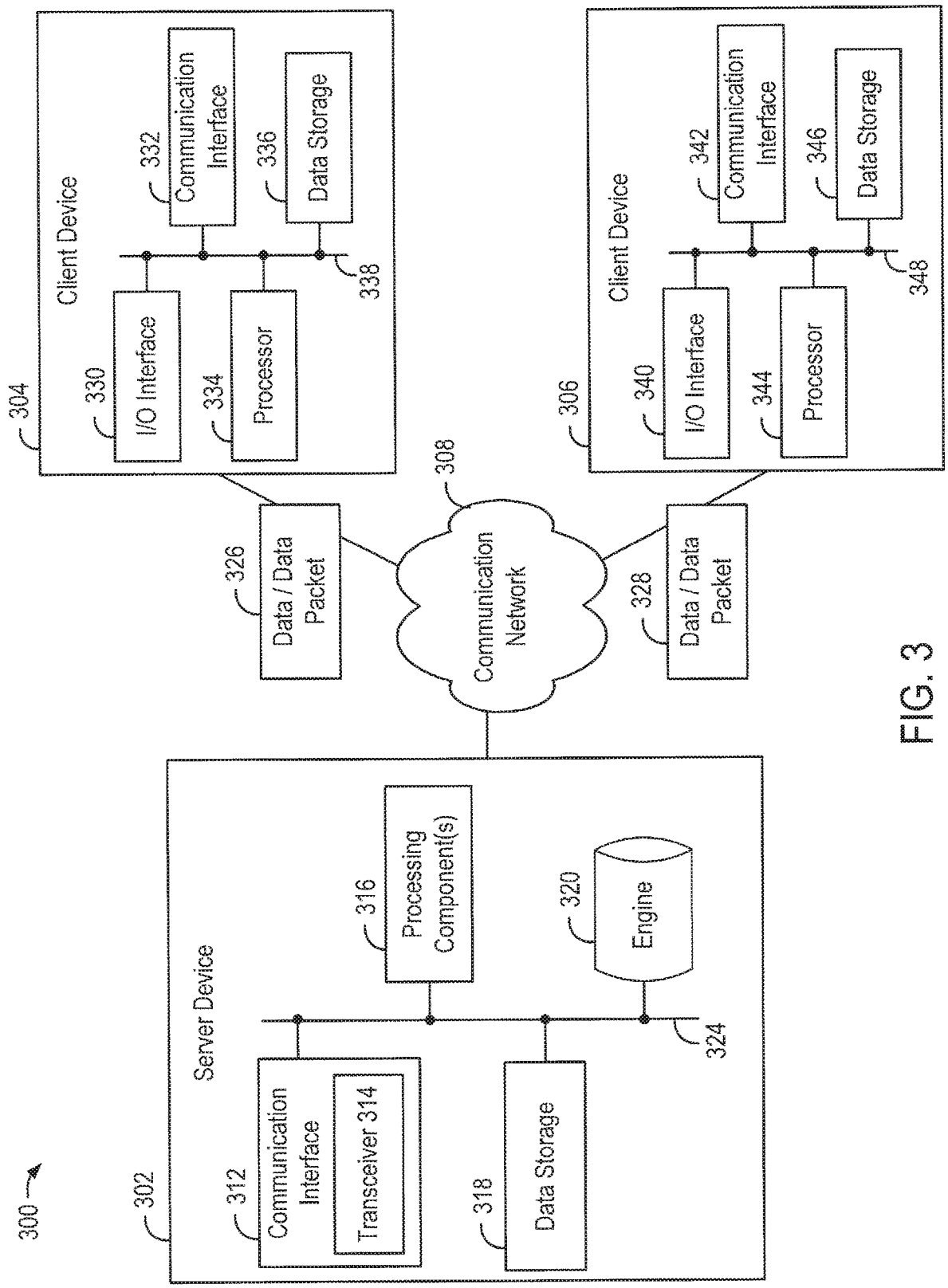
FIG. 3 illustrates a block diagram of an example system, according to an embodiment.

FIG. 3 is a block diagram of an example system 300, according to an embodiment. As shown, the system 300 includes multiple computing devices, such as a server device 302, a client device 304 that may take the form of the computing device 100, and a client device 306 that may take the form of the computing device 200, among other possible computing devices. The server device 302 may be configured to support, manage, and/or aggregate input data from client devices 304 and/or 306. The system 300 may operate with more or less computing devices than those shown in FIG. 3, where each device may be configured to communicate over a communication network 308. As shown, the server device 302, the client device 304, and the client device 306 are each configured to communicate over the communication network 308.

The server device 302 may be configured to perform various operations in accordance with this disclosure and the accompanying figures. For example, the server device 302 may access a number of the inputs received by the client device 304 and/or the client device 306. In particular, the server device 302 may aggregate input data associated with the number of inputs received by the client devices 304 and/or 306. For example, the server device 302 may aggregate various forms of input data such as, for example, the input data described above in relation to FIGS. 1-2. Further, the server device 302 may determine identity data of the user account based on the aggregation of the input data. Yet, further, the server device 302 may send various indications, e.g., recommendations, to the client device 304 and/or 306 accordingly.

In some embodiments, the server device 302 may take a variety of forms and may include a multiple components, including for example, a communication interface 312, a transceiver 314, one or more processing components 316, a data storage 318, and an engine 320 any of which may be communicatively linked to the other components via a system bus, network, or other connection mechanism 324.

The communication interface 312 may take a variety of forms and may be configured to allow the server device 302 to communicate with one or more devices 304 and/or 306 according to a number of protocols. For example, the communication interface 312 may include the transceiver 314 configured to allow the server device 302 to communicate with the client devices 304 and/or 306 via communication network 308. In one example, the communication interface 312 and/or the transceiver 314 may take the form of a wired interface, such as an Ethernet interface. As another example, the communication interface 312 and/or the transceiver 314 may take the form of a wireless interface, such as a cellular interface, a WI-FI interface, another short-range, point-to-multipoint voice and/or data transfer communication interface, such as BLUETOOTH or BLE (BLUETOOTH LOW ENERGY).

The one or more processing components 316 may take the form of a general purpose processor (e.g., a microprocessor) and/or a special purpose processor such as a digital signal processor (DSP), an application specific integrated circuit (ASIC), a programmable system on chip (PSOC), field-programmable gate array (FPGA), and/or another processing component configured to process input data, passive input data, location data, identity data, account data, and/or other types of data. For example, the data packets 326 and/or 328 may be accessed from the client devices 304 and 306, respectively, over the communication network 308. Further, the data packets 326 and 328 may include IP addresses of the client device 304 and 306, respectively. One or more of the processing components 316 may access the data packets 326 and/or 328 associated with a user account accessible by the client device 304. Yet further, the data packets 326 and 328 may be accessible via protocols such as Transmission Control Protocol/Internet Protocol (TCP/IP). In various embodiments, each of the packets 326 and 328 may include 1,000 to 1,500 bytes, among other possible ranges.

The data storage 318 may include one or more of volatile, non-volatile, and/or removable storage components, such as magnetic, optical, or flash storage, and may be integrated in whole or in part with the one or more processing component. Further, the data storage 318 may include or take the form of a non-transitory computer-readable storage medium, having stored thereon machine- or computer-readable instructions (e.g., compiled or non-compiled program logic and/or machine code) that, when executed by the server device 302, cause the server device 302 to perform operations, such as those described in this disclosure and illustrated by the accompanying figures.

The database engine 320 may include numerous databases for storing, processing, and/or securing data of the server 302. For example, the database engine 320 may include relational databases for online transaction processing and/or online analytical processing. The database engine 320 may generate numerous search queries, search multiple databases parallel, and produce search results simultaneously and/or consecutively. As such, the database engine 320 may create multiple tables, database objects, indices, and/or views to perform the online transaction processing and/or analytical processing.

The client devices 304 and 306 may also be configured to perform a variety of operations such as those described in this disclosure and illustrated by the accompanying figures. For example, client devices 304 and 306 may be configured to exchange data packets with the server device 302, such as data packets 326 and 328 including input data, passive input data, location data, identity data, account data, and/or other types of data. Client devices 304 and 306 may take a variety of forms, including for example, a wearable computing device, a personal computer (PC), a smartphone, a laptop/tablet computer, a merchant device, a smart watch with appropriate computer hardware resources, and/or other types of computing devices capable of transmitting and/or receiving data. Client devices 304 and 306 may include various components, including, for example, input/output (I/O) interfaces 330 and 340, communication interfaces 332 and 342, processors 334 and 344, and data storages 336 and 346, respectively, all of which may be communicatively linked with each other via a system bus, network, or other connection mechanisms 338 and 348, respectively.

The I/O interfaces 330 and 340 may be configured for facilitating interaction between client devices 304 and 306 and the user of client devices 304 and 306, possibly accessing their account via the client devices 304 and 306. In some instances, the I/O interfaces 330 and 340 may include sensors such as those described above in relation to FIGS. 1-2. The sensors may be configured to receive inputs from a user and possibly provide outputs to the user. The I/O interfaces 330 and 340 may also include input hardware such as a touchscreen, a touch sensitive panel, a microphone for receiving voice commands, a computer mouse, a keyboard, and/or other input hardware. In addition, I/O interfaces 330 and 340 may include output hardware such as displays possibly with touchscreen inputs, a sound speaker, other audio output mechanism, a haptic feedback system, and/or other output hardware.

In some embodiments, communication interfaces 332 and 342 may take a variety of forms and may be configured to allow client devices 304 and 306 to communicate with one or more devices according to any number of protocols. For instance, communication interfaces 332 and 342 may be configured to allow client devices 304 and 306, respectively, to communicate with the server device 302 via the communication network 308. The processors 334 and 344 may include general purpose processors and/or special purpose processors. The data storages 336 and 346 may include one or more volatile, non-volatile, and/or removable storage components, and may be integrated in whole or in part with processors 334 and 344, respectively. Further, the data storages 336 and 346 may take the form of non-transitory computer-readable storage mediums, having stored thereon machine- or computer-readable instructions that, when executed by processors 334 and 344, cause client devices 304 and 306 to perform operations, respectively, such as those described in this disclosure and illustrated by the accompanying figures. Such machine- or computer-readable instructions may define or be part of a discrete software application, such a native app and/or web app, that may be executed upon user input.

In some embodiments, the communication network 308 may exchange data among the server device 302, the client device 304, the client device 306, and/or other client devices. The communication network 308 may be a packet-switched network configured to provide digital networking communications and/or exchange data of various forms, content, type, and/or structure. The communication network 308 may correspond to small scale communication networks, such as a private and/or local area network. The communication network 308 may also correspond to a larger scale network, such as a wide area network or the Internet, possibly accessible by the various devices of system 300. The communication network 308 may include network adapters, switches, routers, network nodes, and/or various buffers and queues to exchange data packets. For example, the communication network 308 may be configured to carry data packets such as a first data packet 326 and a second data packet 328 including input data, passive input data, location data, identity data, account data, and/or other types of data. The server device 302 may exchange such packets 326 and/or 328 between the client device 304 and/or the client device 306 over the communication network 308 using various protocols such as Transmission Control Protocol/Internet Protocol (TCP/IP), among other possibilities.

It can be appreciated that the server device 302 and the client device 304 and 306 illustrated in FIG. 3 may be deployed in other ways such that the operations performed by such devices may be combined or separated for a given embodiment. Notably, the operations may be performed by a greater number or a fewer number of devices and/or server devices.

Figure 4A:
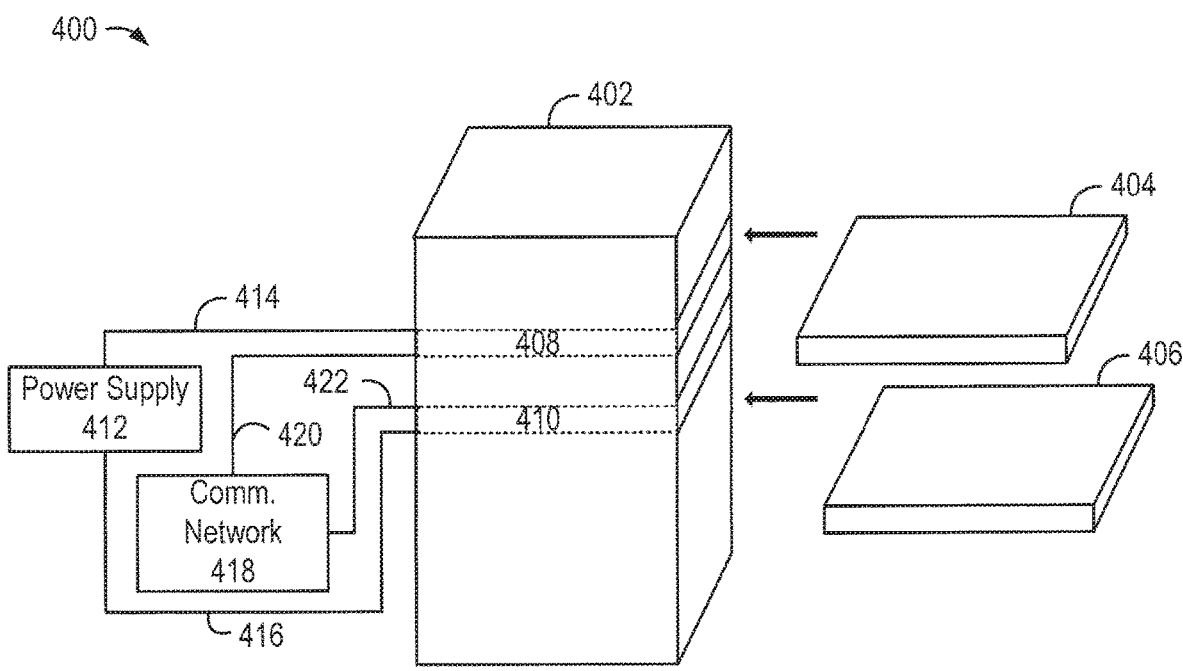
FIG. 4A illustrates an exemplary server device configured to support a set of trays, according to an embodiment.

FIG. 4A illustrates an exemplary server device 400 configured to support a set of trays, according to an embodiment. Server device 400 may, for example, take the form of the server device 302 described above. Further, the server device 400 may be configured to support, operate, run, and/or manage a user account service and various types of data including input data, passive input data, location data, identity data, account data, and/or other types of data.

As shown, server device 400 may include a chassis 402 that may support trays 404 and 406, and possibly multiple other trays as well. The chassis 402 may include slots 408 and 410 configured to hold trays 404 and 406, respectively. For example, the tray 404 may be inserted into the slot 408 and the tray 406 may be inserted into the slot 410. Yet, the slots 408 and 410 may be configured to hold the trays 404 and 406 interchangeably such that the slot 408 may be configured to hold the tray 406 and the slot 410 may be configured to hold the tray 404.

The chassis 402 may be connected to a power supply 412 via connections 414 and 416 to supply power to the slots 408 and 410, respectively. The chassis 402 may also be connected to communication network 418 via connections 420 and 422 to provide network connectivity to the slots 408 and 410, respectively. As such, trays 404 and 406 may be inserted into slots 408 and 410, respectively, and power supply 412 may supply power to trays 404 and 406 via connections 414 and 416, respectively.

The communication network 418 may, for example, take the form of communication network 308 described above in relation to FIG. 3. In some embodiments, communication network 418 may provide a network port, a network hub, a network switch, or a network router that may be connected to a telephone, Ethernet, or an optical communication link, among other possibilities.

Figure 4B:
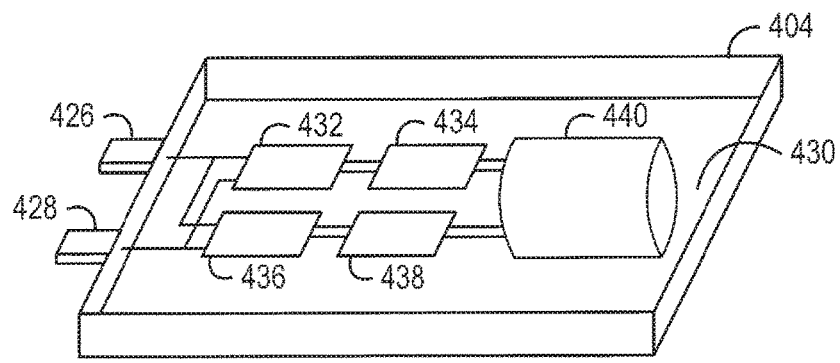
FIG. 4B illustrates an exemplary tray configured to support one or more components, according to an embodiment.

FIG. 4B illustrates an exemplary tray 404 configured to support one or more components, according to an embodiment. The tray 404 may, for example, take the form of tray 404 described in relation to FIG. 4A. As shown, the tray 404 may include a tray base 430 as the bottom surface of the tray 404 configured to support multiple components such one or more components 432-440. The tray 404 may include a connector 426 that may link to the connections 414 or 416 to supply power to the tray 404. The tray 404 may also include a connector 428 that may link to the connections 420 or 422 to provide network connectivity to the tray 404. The connectors 426 and 428 may be positioned on the tray 404 such that upon inserting the tray 404 into the slot 408, the connectors 426 and 428 couple directly with the connections 414 and 420, respectively. Further, upon inserting the tray 404 into the slot 410, the connectors 426 and 428 may couple directly with connections 416 and 422, respectively.

The tray 404 may include components 432-440. In some instances, a communication interface 432, a transceiver 434, one or more processing components 436, a data storage 438, and a database engine 420 may, for example, take the form of the communication interface 312, the transceiver 314, the one or more processing components 316, the data storage 318, and the data base engine 320, respectively. As such, the server 400 and the tray 404 may be configured to provide power and network connectivity to each of the components 432-440. In some embodiments, one or more of the components 432-440 may be configured to operate via one or more circuits that include resistors, inductors, capacitors, voltage sources, current sources, switches, logic gates, registers, and/or a variety of other circuit elements. One or more of the circuit elements in a circuit may be configured to provide support the components 432-442 to perform the operations described herein. As such, in some embodiments, preconfigured and dedicated circuits may be implemented to perform the operations of the components 432-440. In some embodiments, a system may execute instructions on a non-transitory, computer-readable medium to configure one or more circuits as required to perform the operations described herein and illustrated by the accompanying figures.

Any two or more of the components 432-440 described above may be combined to take the form of one or more general purpose processors, microprocessors, and/or special purpose processors, among other types of processors. For example, two or more of the communication interface 432, the transceiver 434, the one or more processing components 436, and the data storage 442 may be combined with and/or within a processing device. Further, the combined processing device may take the form of one or more network processors, DSPs, PSOCs, FPGAs, and/or ASICs, among other types of processing devices and/or components. As such, the combined processing device may be configured to carry out various operations of the components 432-440.

A system may include a non-transitory computer-readable medium, such as those described in FIGS. 3-4. The medium may have stored thereon machine- or computer-readable instructions that are executable by a server device, such as the server devices 302 and/or 400. When the instructions are executed, the server device may perform various operations. For example, the operations may include accessing, by a communication interface of the server device, a number of inputs received by a computing device. In particular, the communication interface, such as the communication interfaces 312 and/or 412, may access the number of inputs. Further, the communication interface may access the number of inputs received by a computing device, such as the computing device 100 and/or the computing device 200, as described above.

The operations may also include aggregating, by one or more processing components of the server device, input data associated with the number of inputs. In some instances, the one or more processing components may aggregate the input data from a number of client devices such as the computing device 100 and/or the attachable computing device 200. The one or more processing components, such as the processing components 316 and/or 436, may aggregate the input data in a database engine of the server device, such as the database engines 320 and/or 440.

The operations may also include determining, by the one or more processing components, identity data of a user account based on the aggregation of the input data, where the identity data indicates one or more activities such as those described above associated with the user account. For example, the one or more processing components may determine the identity data of the user account from the input data aggregated in the database engines 320 and/or 440. The one or more processing components may organize, select, and/or modify the various portions of the aggregated input data to compile the identity data, for example. The operations may also include transmitting, by a transceiver of the communication interface, an indication of the identity data to the computing device possibly taking the form of one or more of the wearable computing devices described above.

Figure 5:
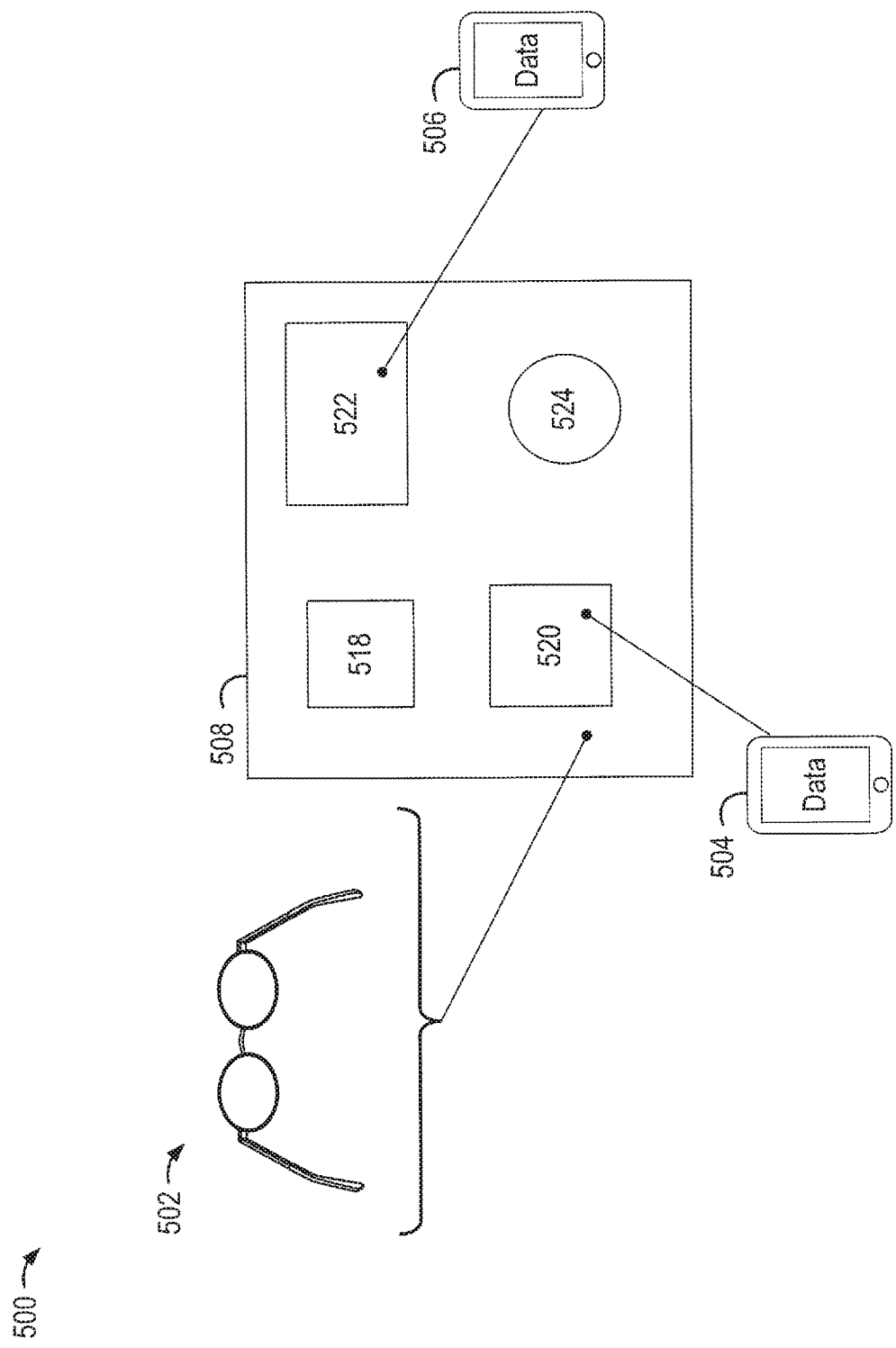
FIG. 5 is an exemplary system, according to an embodiment.

In some embodiments, the machine- or computer-readable instructions may cause the server device to perform additional operations such as authenticating, by the one or more processing components, the user account based on the identity data. For example, consider FIG. 5, where an exemplary system 500 includes a wearable computing device 502 that may, for example, take the form of a smartphone or the computing device 100. Further, the system 500 includes merchant devices 504 and 506 that may, for example, be located in stores 520 and 522, respectively, shown on a map 508 for illustrative purposes. As shown, the multiple stores 518, 520, 522, and 524 are located proximate to one another.

In addition to active input data such as fingerprint data and voice command data, the identity data may include passive input data received by the sensors of the wearable computing device 502. For example, consider a scenario where the identity data includes movement data based on the way a user moves while wearing the computing device 502 proximate to the store 520, possibly while shopping for clothing. The identity data may include other forms of data related to the way the user talks, walks, stops walking, and/or changes direction proximate to the store 520, among other factors to recognize the user while shopping and/or looking at items in the store 520. Based on the identity data used to recognize the particular user, the user account may be authenticated. Further, the operations may include enabling the wearable computing device 502 to access the merchant device 504 at the store 520, the merchant device 506 at the store 522, and/or an application (e.g., an online shopping website) based on the authentication, possibly to purchase an item at the stores 520 and/or 522.

In some embodiments, the authentication of the user account may be used to securely authenticate activities of the user account. For example, enabling the user account to access the merchant devices 504, 506, and/or the applications may include securing the input data and the identity data from the merchant devices 504, 506, and/or the applications. As such, the merchant devices 504, 506, and/or the applications may be unable to access the input data and the identity data. The merchant devices 504, 506, and/or the applications may be blocked from accessing the input data and the identity data, leaving such data secure from third parties.

In some embodiments, aggregating the input data as described above may include determining shopping pattern data from the input data. For example, considering the scenario above where the wearable computing device 502 is proximate to the store 520. The server device may determine data (e.g., movement data and/or position data) indicative of the user shopping proximate to the stores 518-524. Thus, the machine- or computer-readable instructions described above may further cause the server device to perform additional operations such as determining, by the one or more processing components, a recommended item based on the shopping pattern data. For example, the server device may determine a clothing item at the store 522 that the user may be interested in based on the way the user slows down and/or pauses to view clothes at the store 520. In some instances, the stores 520 and 522 may have one or more similar styles of clothes and/or possibly similar sales or deals. Thus, the operations may include determining an indication of the recommended item at the store 522 and transmitting the indication of recommended item to the wearable computing device 502.

In some embodiments, aggregating the input data may include determining size data associated with the user account from the input data. For example, the wearable computing device 502 may be worn on the user's wrist as described above in relation to FIG. 1B. As such, the aggregated input data may include size data indicative of the user's head, possibly based on the wearable computing device 502 measuring the circumference of the user's head. Thus, the machine- or computer-readable instructions described above may further cause the server device to perform additional operations such as determining, by the one or more processing components, a recommended item (e.g., a hat) at a store location 522 based on the size data. Thus, the operations may include determining an indication of the recommended item at the store location 522 and transmitting the indication of the recommended item and the store location 522 to the wearable computing device 502. In some instances, transmitting the indication of the recommended item to the wearable computing device 502 may authenticate one or more purchases of recommended items via the wearable computing device 502 under the user account.

FIG. 6 is a flowchart of an exemplary method 600 for aggregating input data and determining identity data, according to an embodiment. Note that one or more steps, processes, and/or methods described herein may be omitted, performed in a different sequence, and/or combined for various types of applications.

At step 602, the method 600 may include aggregating, by one or more processing components of a server device, input data associated with a number of inputs received by a computing device. The one or more processors of the server device may aggregate the input data in any manner described above in relation to FIGS. 1-5. For example, the one or more processors may aggregate input data received by a smartphone, a wearable computing device, and/or an attachable computing device.

At step 604, the method 600 may include determining, by the one or more processing components of the server device, identity data of a user account based on the aggregation of the input data, where the identity data indicates one or more activities of the user account. The one or more processors of the server device may determine the identity data of the user account in any manner described above in relation to FIGS. 1-5. For example, the one or more processors may determine identity data of the user account based on the aggregation of input data including movement data received by the smartphone, wearable computing device, and/or the attachable computing device.

At step 606, the method 600 may include transmitting, by a communication interface of the server device, an indication of the identity data to a computing device configured to access the user account. As noted, the computing device may be the wearable computing device, the attachable computing device, and/or any other types of devices described above such as a smart phone.

In some embodiments, the method 600 may further include authenticating the user account based on the identity data. For example, consider FIG. 7, where an exemplary system 700 includes a computing device 702 that may, for example, take the form of a smartphone or the computing device 100. Further, the system 700 includes an attachable computing device 703 that may, for example, take the form of the computing device 200. As such, the method 600 may include authenticating the user account based on the identity data. For example, the identity data may be determined based on the input data received by the wearable computing device 702 and the attachable computing device 702, where the input data may indicate that the wearable computing device 702 and the attachable computing device 703 are linked as described above in relation to FIGS. 1-2. Linking the wearable computing device 702 with the attachable computing device 703 may indicate that the user has possession of both the wearable computing device 702 and the attachable computing device 703, thereby authenticating the user account. Thus, the method 600 may further include enabling the user account to access one or more applications based on the authentication, possibly to make one or more purchases.

Figure 7:
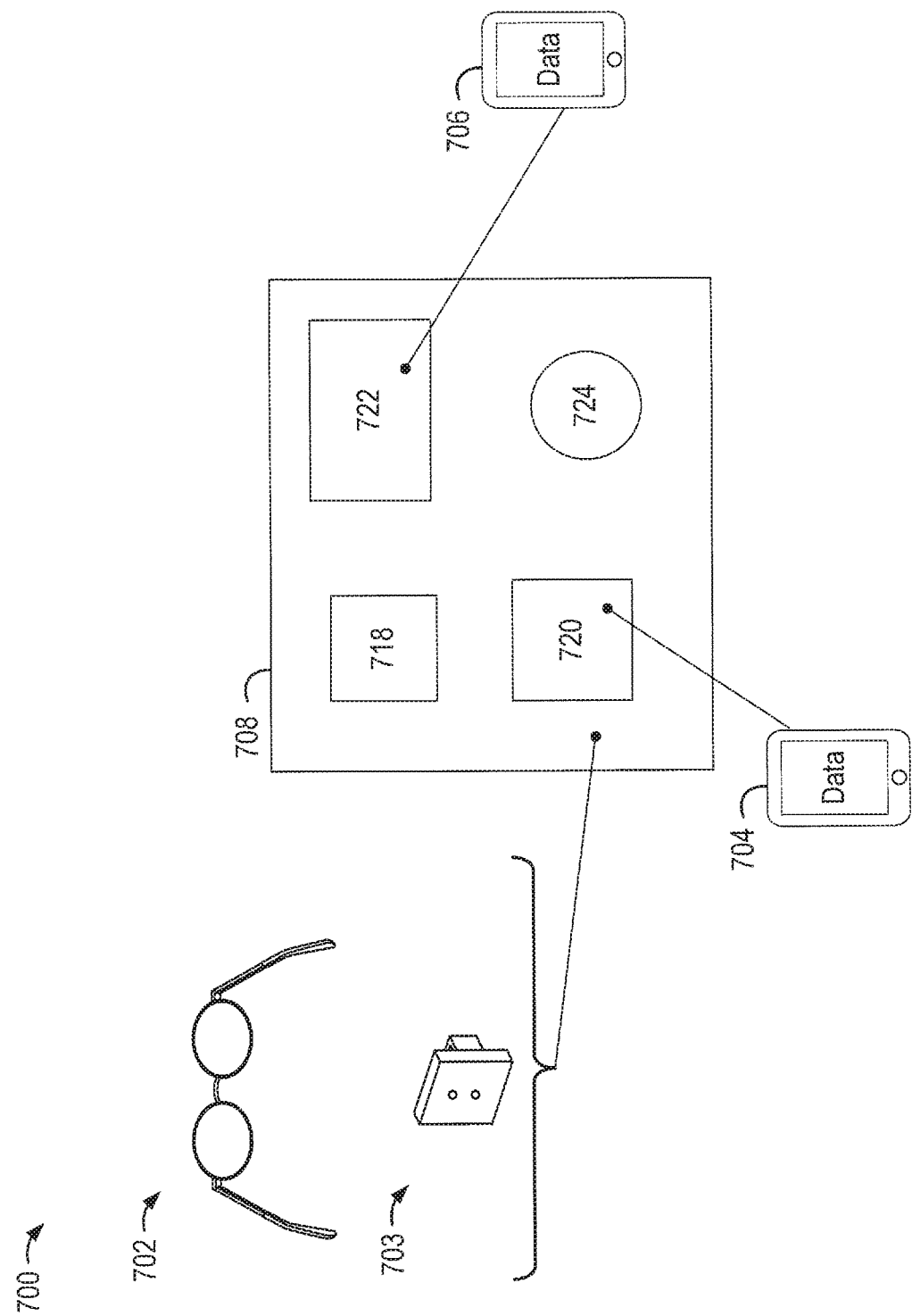
FIG. 7 is an exemplary system, according to an embodiment.

In some embodiments, enabling the user account to access the one or more applications includes securing the identity data from the one or more applications such that the one or more applications are unable to access the identity data. As shown in FIG. 7, for example, the user account associated with the wearable computing device 702 may access one or more applications on the merchant device 704 to make a purchase. Yet, the one or more applications may be unable to access data, such as the identity data, from the wearable computing device 702. As shown, the system 700 may include merchant devices 704 and 706 that may, for example, be located in stores 720 and 722, respectively, shown on a map 708 provided for illustrative purposes. As shown, the multiple stores 718, 720, 722, and 724 are located proximate to one another.

In some embodiments, aggregating the input data includes determining shopping pattern data from the input data. For example, consider the scenario above where the wearable computing device 702 and the attachable computing device 703 are linked and located proximate to the store 720. The one or more processing components may determine input data (e.g., movement data and/or positioning data) from the devices 702 and 703 indicative of the user walking proximate to the stores 720-724. For example, input data from the wearable computing device 702 may be compared with the input data from the attachable device 703, and the compared data may be determined as the shopping pattern data. Thus, the method 600 may further include determining, by the one or more processing components, a recommended item based on at least the shopping pattern data. For example, the processing components may determine an item at store 722 that the user is likely to be interested in based on the data received by the devices 702 and 703, indicating the user is viewing clothes at the store 720. In this scenario, the stores 720 and 722 may include similar types of clothes, garments, apparels, and/or accessories. Thus, the method 600 may further include transmitting an indication of the recommended item to the wearable computing device 702.

In some embodiments, aggregating the input data may include determining size data associated with the user account from the input data. For example, the wearable computing device 702 and the attachable computing device 703 may receive input data associated with size data (e.g., the length of the user's pants), possibly where the wearable computing device 702 is worn on the user's head and the attachable computing device 703 is attached to the user's belt buckle or a similar accessory on the user's waist. In particular, the wearable computing device 703 may approximate a first distance from the user's head to the ground using its sensors and distance approximation. By subtracting a second distance (e.g., between the wearable computing device 702 and the attachable computing device 703) from the first distance, the length of the user's pants may be estimated. As such the method 600 may further include determining, by the one or more processing components, a recommended item (i.e., a pair of pants) at a store location 722 based on the size data. Further, the method 600 may include transmitting an indication of the recommended item at the store location to the wearable computing device 702.

In some embodiments, the method 600 may include causing the computing device to display at least one of the identity data and one or more recommended items. For example, consider FIG. 8, where a computing device 800 displays identity data and a recommended item. The computing device 800 may take the form of a smartphone or the computing device 100. For example, the wearable computing device 800 may include the lens 802, the side component 806, the middle component 810, and the display 812 that may take the form of the lens 102, the side component 106, the middle component 110, and the display 112, respectively, of the computing device 100. As shown, the wearable computing device 800 may receive identity data 804 from the server device, causing the wearable computing device 800 to display the recommended item 808 at the store location 822. As shown, the identity data 804 may include an indication, "You are here," and the store location 822 on a map 828 such that the user can navigate to the store location 822. Further, the display 812 may be transparent where the identity data 804 and the store location 822 on the map 828 may be partially see-through. As such, the display 812 may provide an augmented reality such that the user can see the identity data 804, the recommended data 808, and the map 828 while looking at a field-of-view (FOV) through the lens 802. Notably, the stores 818, 820, 822, and 824 correspond to the stores 718, 720, 722, and 724, respectively, as described above.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system comprising:
a non-transitory memory; and
one or more hardware processors coupled to the non-transitory memory and configured to read instructions from the non-transitory memory to cause the system to perform operations comprising:
receiving, from one or more sensors associated with a wearable device of a first user, first movement data indicating that the wearable device has been removed from a first part of a body of the first user, wherein a user account of the first user is associated first movement data corresponding to a movement pattern of the first part of the body of the first user while the first user was previously engaged in a first activity and while the wearable device was not separated from the first user;
receiving, from the one or more sensors, second movement data indicating that the wearable device has been removed from the first part of the body of the first user;
after the receiving the second movement data, receiving, from the one or more sensors, third movement data corresponding to a movement pattern of the first part of a body of a second user currently wearing the wearable device while the second user is detected engaging in the first activity;
detecting that the second user is at a predefined location;
analyzing the third movement data at least in part by comparing a pattern of the third movement data with a pattern of the first movement data, wherein the comparing further comprises comparing the first movement data of the first user when the first user is at the predefined location with the third movement data of the second user when the second user is at the predefined location;
determining, based at least in part on the analyzing of the third movement data, that the second user is different from the first user; and
denying an authentication of the second user in response to the determining that the second user is different from the first user.

2. The system of claim 1, wherein the user account is further associated with first size data of the at least the first part of the body of the first user, wherein the operations further comprise receiving, from the one or more sensors, second size data of the first part of the body of the second user, and wherein the determining is further based on comparing the first size data with the second size data.

3. The system of claim 1, wherein the third movement data is received continually from the one or more sensors throughout an engagement of the first activity by the second user.

4. The system of claim 1, wherein the operations further comprise securing the first movement data and the third movement data from one or more third party applications.

5. The system of claim 1, wherein the user account is further associated with first biometric data of the first user, wherein the operations further comprise receiving, from the one or more sensors, second biometric data of the second user, the first biometric data and the second biometric data comprising at least one of Deoxyribonucleic acid (DNA) data, salivary data, sweat data, pulse data, hair data, nail data, or blood data, and wherein the determining is further based on comparing the first biometric data with the second biometric data.

6. The system of claim 1, wherein the one or more sensors includes an accelerometer, a gyroscope, a compass, a barometer, a capacitive sensor, a haptic sensor, a temperature sensor, an ambient light sensor, a sound sensor, an image sensor, a biometric sensor, a moisture sensor, an electrode, or a chemical sampling sensor.

7. The system of claim 1, wherein the first movement data comprises a movement of a hand, a wrist, or a head of the first user, or a stride pattern of the first user, and wherein the third movement data comprises a movement of a hand, a wrist, or a head of the second user, or a stride pattern of the second user.

8. The system of claim 1, wherein the determining comprises determining that the second user is a thief.

9. A method comprising:
receiving, from one or more sensors associated with a wearable device of a first user, first movement data indicating that the wearable device has been removed from a first part of a body of the first user, wherein a user account of the first user is associated first movement data corresponding to a movement pattern of the first part of the body of the first user while the first user was previously engaged in a first activity and while the wearable device was not separated from the first user;
receiving, from the one or more sensors, second movement data indicating that the wearable device has been removed from the first part of the body of the first user;
after the receiving the second movement data, receiving, from the one or more sensors, third movement data corresponding to a movement pattern of the first part of a body of a second user currently wearing the wearable device while the second user is detected engaging in the first activity;
detecting that the second user is at a predefined location;

analyzing the third movement data at least in part by comparing a pattern of the third movement data with a pattern of the first movement data, wherein the comparing further comprises comparing the first movement data of the first user when the first user is at the predefined location with the third movement data of the second user when the second user is at the predefined location;

determining, based at least in part on the analyzing of the third movement data, that the second user is different from the first user; and denying an authentication of the second user in response to the determining that the second user is different from the first user.

10. The method of claim 9, wherein the third movement data is received continually from the one or more sensors throughout an engagement of the first activity by the second user.

11. The method of claim 9, further comprising securing the first movement data and the third movement data.

12. The method of claim 9, wherein the one or more sensor includes an accelerometer, a gyroscope, a compass, a barometer, a capacitive sensor, a haptic sensor, a temperature sensor, an ambient light sensor, a sound sensor, an image sensor, a biometric sensor, a moisture sensor, an electrode, or a chemical sampling sensor.

13. The method of claim 9, wherein the first movement data comprises a movement of a hand, a wrist, or a head of the first user, or a stride pattern of the first user, and wherein the third movement data comprises a movement of a hand, a wrist, or a head of the second user, or a stride pattern of the second user.

14. The method of claim 9, wherein the user account is further associated with first size data of the at least the first part of the body of the first user, wherein the method further comprises receiving, from the one or more sensors, second size data of the first part of the body of the second user, and wherein the determining is further based on comparing the first size data with the second size data.

15. The method of claim 9, wherein the determining comprises determining that the second user is a thief.

16. A non-transitory computer-readable medium having stored thereon executable instructions that causes a system to perform operations comprising:

receiving, from one or more sensors associated with a wearable device of a first user, first movement data indicating that the wearable device has been removed from a first part of a body of the first user, wherein a user account of the first user is associated first movement data corresponding to a movement pattern of the first part of the body of the first user while the first user was previously engaged in a first activity and while the wearable device was not separated from the first user;

receiving, from the one or more sensors, second movement data indicating that the wearable device has been removed from the first part of the body of the first user;

after the receiving the second movement data, receiving, from the one or more sensors, third movement data corresponding to a movement pattern of the first part of a body of a second user currently wearing the wearable device while the second user is detected engaging in the first activity;

detecting that the second user is at a predefined location;

analyzing the third movement data at least in part by comparing a pattern of the third movement data with a pattern of the first movement data, wherein the comparing further comprises comparing the first movement data of the first user when the first user is at the predefined location with the third movement data of the second user when the second user is at the predefined location;

determining, based at least in part on the analyzing of the third movement data, that the second user is different from the first user; and denying an authentication of the second user in response to the determining that the second user is different from the first user.

17. The non-transitory computer-readable medium of claim 16, wherein the user account is further associated with first size data of the at least the first part of the body of the first user, wherein the operations further comprise receiving, from the one or more sensors, second size data of the first part of the body of the second user, and wherein the determining is further based on comparing the first size data with the second size data.

18. The non-transitory computer-readable medium of claim 16, wherein the first movement data comprises a movement of a hand, a wrist, or a head of the first user, or a stride pattern of the first user, and wherein the third movement data comprises a movement of a hand, a wrist, or a head of the second user, or a stride pattern of the second user.

19. The non-transitory computer-readable medium of claim 16, wherein the one or more sensors includes an accelerometer, a gyroscope, a compass, a barometer, a capacitive sensor, a haptic sensor, a temperature sensor, an ambient light sensor, a sound sensor, an image sensor, a biometric sensor, a moisture sensor, an electrode, or a chemical sampling sensor.

20. The non-transitory computer-readable medium of claim 16, wherein the determining comprises determining that the second user is a thief.

* * * * *